United States Patent [19]

Levain

[11] Patent Number: 5,101,316

[45] Date of Patent: Mar. 31, 1992

[54] MICROPROCESSOR-BASED TRIP DEVICE WITH OPTIONAL FUNCTIONS AND SELECTION PROCESS OF SAID FUNCTIONS

[75] Inventor: Marc Levain, Grenoble, France

[73] Assignee: Merlin Gerin, France

[21] Appl. No.: 430,366

[22] Filed: Nov. 2, 1989

[30] Foreign Application Priority Data

Nov. 2, 1988 [FR] France .................. 88 14391

[51] Int. Cl.⁵ .............................. H02H 3/08
[52] U.S. Cl. ........................ 361/93; 395/100
[58] Field of Search ..................... 361/93–97; 364/483, 521; 340/811

[56] References Cited

U.S. PATENT DOCUMENTS

| | | | |
|---|---|---|---|
| 4,672,501 | 6/1987 | Bilac et al. | 361/96 |
| 4,694,373 | 9/1987 | Demeyer | 361/96 |
| 4,870,531 | 9/1989 | Danek | 361/93 |

FOREIGN PATENT DOCUMENTS

| | | |
|---|---|---|
| 0021288 | 1/1981 | European Pat. Off. |
| 2513436 | 3/1983 | European Pat. Off. |
| 0193449 | 9/1986 | European Pat. Off. |
| 2595174 | 9/1987 | France |

Primary Examiner—Todd E. DeBoer
Attorney, Agent, or Firm—Parkhurst, Wendel & Rossi

[57] ABSTRACT

The optional functions of a microprocessor-based trip device are selected by means of keys of a keypad. the different options are displayed sequentially on a display during running of a selection subroutine contained in a read-only memory (ROM), the keypad enabling the selected option to be stored in an EEPROM memory.

6 Claims, 2 Drawing Sheets

MICROPROCESSOR-BASED TRIP DEVICE WITH OPTIONAL FUNCTIONS AND SELECTION PROCESS OF SAID FUNCTIONS

BACKGROUND OF THE INVENTION

The invention relates to a microprocessor-based trip device for an electrical circuit breaker, comprising:

current detection means, generating analog signals representative of the currents flowing in the conductors protected by the circuit breaker, analog to digital conversion means to which the analog signals are applied and which supply corresponding digital signals, a microprocessor-based digital processing unit to which the digital signals are applied to perform at least standard long delay and/or short delay tripping functions and which generates a circuit breaker tripping order when preset parameters are exceeded, said unit comprising a keypad for an operator to enter the tripping parameters, display means, a random-access memory and a read-only memory connected to the microprocessor, the read-only memory comprising a plurality of subroutines corresponding to the standard functions and to a plurality of optional functions of the trip device, means enabling certain optional functions to be selected, and circuit breaker tripping means actuated by the tripping order.

In state-of-the-art microprocessor-based trip devices of the type mentioned above, selection of the optional functions is achieved by means of electrical contacts, for example microswitches, whose position is representative of the options selected.

It has also been proposed (U.S. Pat. No. 4,694,373) to fit several different non-volatile memories for each trip device, each memory associated with a possible option, choice of the option being made by fitting the relevant memory in the trip device.

SUMMARY OF THE INVENTION

The object of the invention is to simplify selection of the optional functions avoiding both the use of different memories for the different options and the use of switches.

This object is achieved according to the invention by the fact that the processing unit comprises an electrically erasable programmable read-only memory (EEPROM) connected to the microprocessor and in which information enabling the required optional functions to be selected is entered via the keypad.

According to a development of the invention, a selection process of the optional functions consists, when the trip device is powered on, in pressing a predetermined key of the keypad, or several keys of the keypad in a predetermined order, so as to trigger running of a selection subroutine of the optional functions contained in the read-only memory (ROM), the different possible options being displayed sequentially on display means, a first key of the keypad enabling a displayed option to be stored in the memory before continuing running the selection subroutine.

In a preferred embodiment, a second key of the keypad monitors running of the subroutine and, when all the optional functions have been stored in the memory, the second key of the keypad enables all the functions selected to be displayed for monitoring purposes.

The optional functions selected are, preferably, first of all stored in the random-access memory, pressing the first key a second time causing them to be stored in the electrically erasable programmable read-only memory only after all the functions selected have been displayed for monitoring purposes.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DESCRIPTION OF THE PREFERRED EMBODIMENT

Figure 1:
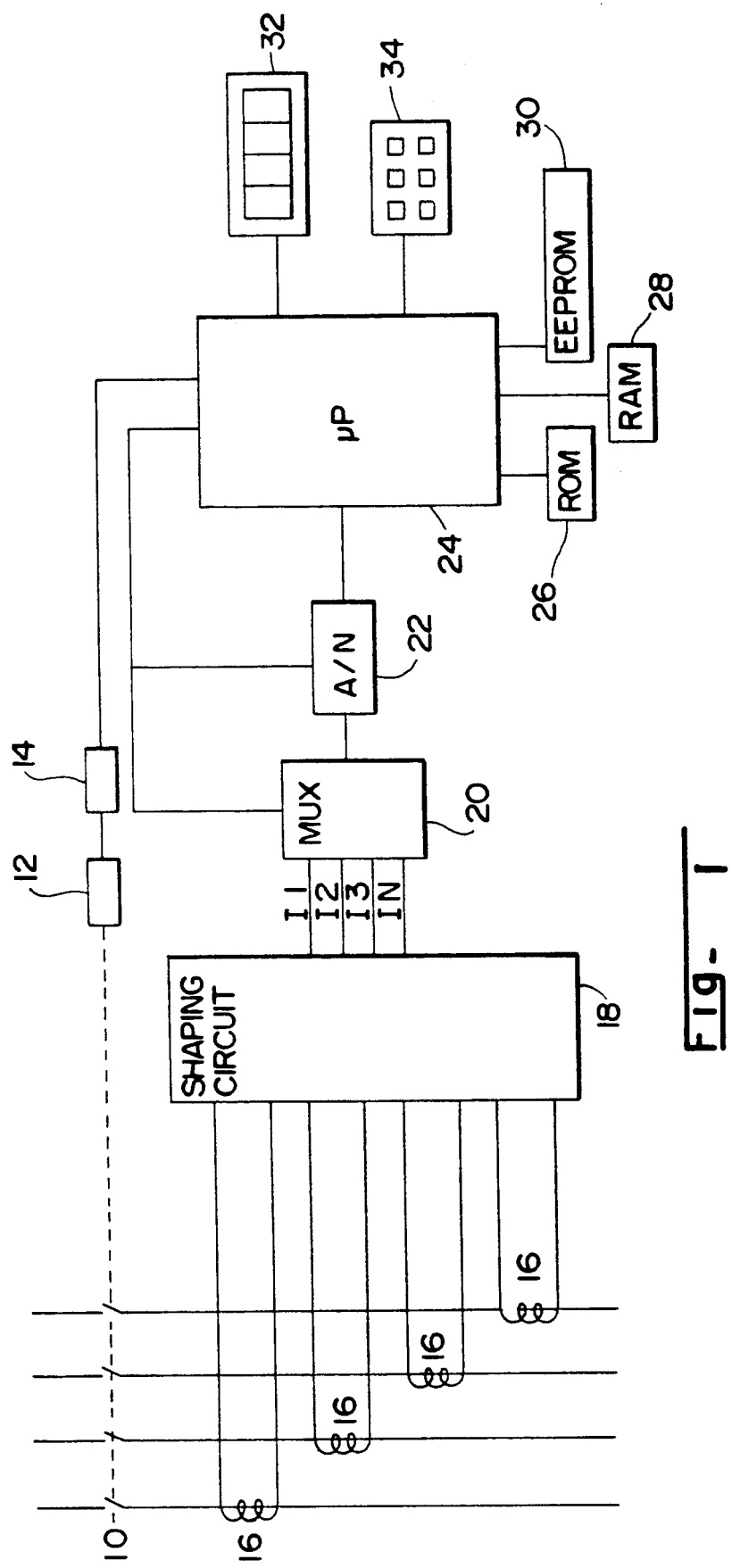
FIG. 1 represents a block diagram of a microprocessor-based trip device for implementation of the invention.

In FIG. 1, an electrical power distribution system supplying a load (not represented) comprises a circuit breaker 10 capable of interrupting the circuit in the open position. The mechanism 12 of the circuit breaker is controlled by a polarized relay 14 ordering tripping of the circuit breaker in the event of an overload or a short-circuit. Each conductor has associated with it a current transformer 16 which delivers an analog signal representative of the current flowing in the associated conductor. This signal is applied to a shaping circuit 18, the outputs I1, I2, I3, IN of which are applied, via a multiplexer 20, to an analog to digital converter 22. The converter output is connected to a first input-output gate of a microprocessor 24, the latter in addition controlling the multiplexer and the converter. The microprocessor is naturally connected to the various auxiliaries (not represented) necessary for it to operate, and to at least one read-only memory (ROM) 26, one random-access memory (RAM) 28 and one electrically erasable programmable read-only memory (EEPROM) 30. Conversation between the microprocessor and an operator takes place via the front face of the trip device comprising display means 32 and a keypad 34.

The trip device performs the standard protection functions, notably long delay and/or short delay tripping, respectively when an overload and a fault occur in the conductor circuit. It is pointless giving a detailed description of these protection functions which are well-known, for example from the above-mentioned U.S. Pat. No. 4,694,373.

Figure 2:
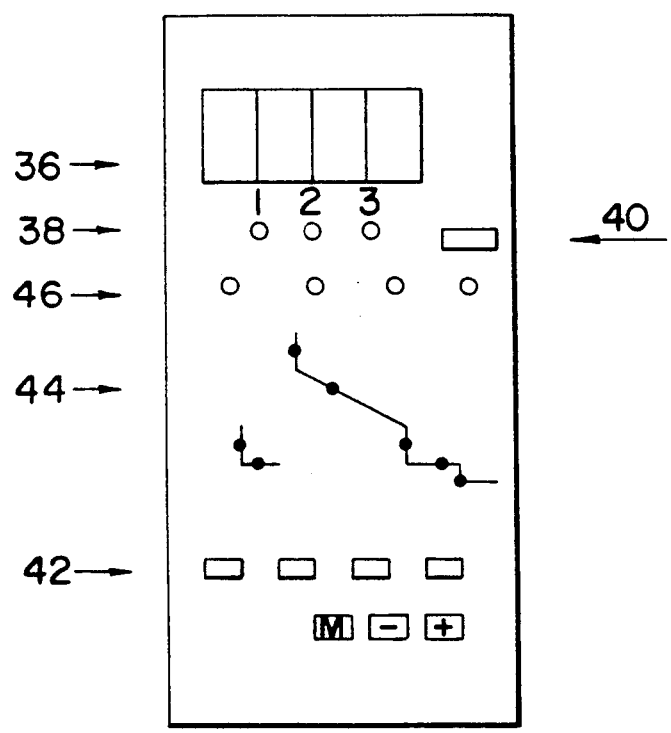
FIG. 2 represents a particular embodiment of the front panel of a trip device according to the invention.

In a preferred embodiment, represented in FIG. 2, the display device comprises a digital, or preferably alphanumeric, display 36 and a set of light-emitting diodes, and the keypad comprises a set of keys notably making it possible to determine the value to be displayed, to enter the tripping parameters (thresholds and time delay) and, according to the invention, to select the optional functions of the trip device.

The digital display 36 notably enables the current measured in one of the conductors to be displayed, a light-emitting diode 38 indicating the conductor involved and a key 40 enabling the current measured in the next conductor to be displayed.

A schematic representation of the protection curves is used in cooperation with keys 42 and light-emitting diodes 44 disposed on these curves to choose the parameters (thresholds, time delay) to be adjusted. Each of the keys 42 enables two parameters to be selected, the first (threshold) when it is pressed once and the second (time delay) when it is pressed a second time. When the parameter to be adjusted has been selected by means of the keys 42, the value of the parameter which is displayed on the digital display 36 can be adjusted by means of two increment (+) and decrement (−) keys. When the required value is reached, a memory key (M) enables this value to be stored in the memory (EEPROM) 30. The parameter selected can be monitored at any time, pressing the appropriate key 42 causing it to be displayed on the display 36.

Light-emitting diodes 46 serve the purpose of indicating the faults detected by the trip device, each diode corresponding to a type of fault (earth fault, long delay, short delay, instantaneous).

According to the invention, some of the keypad keys are used to select the optional functions of the trip device.

To trigger the optional functions selection process, a predetermined key has to be pressed, or several keys of the keypad in a predetermined order, when the trip device is powered on. This type of procedure ensures that there is practically no risk of a user triggering the selection process by chance and unwittingly modifying the choice of the optional trip device functions, the selection normally being made in the factory. This causes a selection subroutine of the optional functions contained in the read-only memory (ROM) 26 to be run. The different possible options are then displayed sequentially on the digital display 36 in the form of 4-figure or letter codes, pressing the increment (+) key causing the next code to be displayed. When the required option is displayed, the operator selects it by pressing the memory store key (M). The corresponding information is then stored, preferably provisionally in the random-access memory (RAM) 28.

When all the options have been selected, successively pressing the increment (+) key enables the 4-figure or letter codes corresponding to the various options selected to be displayed successively for monitoring purposes. The selection procedure is then terminated by pressing the memory store key (M) which transfers the information corresponding to the optional functions selected from the random-access memory (RAM) 28 to the memory (EEPROM) 30.

While the selection subroutine is running, only the memory store (M) and increment (+) keys are operative.

To give some non-restrictive examples, this process makes it possible to determine whether or not the trip device is to include an earth protection function, a constant time short delay tripping function, the instantaneous tripping level, the circuit breaker rating, and so on.

To enable earth protection to be selected, for instance, the subroutine first displays a code "T.--", the digit "." corresponding to the one whose value has to be determined. Successively pressing the increment (+) key runs the codes TO-- and TT-- corresponding respectively to the absence or presence of earth protection. Pressing the memory store key enables the required function to be selected. The same principle is used for all the optional functions whose codes are naturally known to the operator.

The optional functions of a trip device can thus be selected via the keypad already used to enter the tripping parameters. Furthermore, the selected functions can easily be monitored by simply pressing the increment key at the end of the selection process and subsequent modification remains possible, the process being able to be simply re-run when the trip device is powered on.

The invention is naturally in no way limited to the use of a keypad of the type represented in FIG. 2 and described above, but can be applied whatever the type of keypad used. It is however particularly advantageous in the case of a simplified keypad, such as the one described, in that the keypad keys are not used to enter a figure or a letter but merely to store preprogrammed data when the latter are displayed on the readout device when the selection subroutine is run.

I claim:

1. A microprocessor-based trip device for an electrical circuit breaker comprising:

current detection means for generating analog signals representative of currents flowing in conductors protected by the circuit breaker;

analog to digital conversion means to which the analog signals are applied for converting said analog signals to digital signals;

a microprocessor-based digital processing unit to which the digital signals are applied to perform at least standard long delay and/or short delay tripping functions and which generates a circuit breaker tripping order when present tripping parameters are exceeded, said unit comprising a keypad, display means, a random-access memory and a read-only memory connected to the microprocessor, the read-only memory comprising a plurality of subroutines corresponding to the standard functions and to a plurality of optional functions of the trip device;

circuit breaker tripping means actuated by the tripping order; and optional function selection means for enabling certain optional functions, said option function selection means comprising said keypad and an electrically erasable programmable read only memory (EEPROM);

wherein said keypad is utilized by an operator to select optional functional subroutines from said ROM and command storage of said selection in said EEPROM and to enter the tripping parameters.

2. The trip device of claim 1, comprising:

means for initiating a selection subroutine, said means being responsive to the activation of a predetermined key of the keypad, or several keys of the keypad in a predetermined order, so as to trigger running of a selection subroutine of the optional functions contained in the read-only memory, the different possible options being displayed sequentially on said display means; and first key means of the keypad, wherein activation of said first key means enables a displayed option to be stored in the memory before continuing running the selection subroutine.

3. The trip device of claim 2, comprising:

second key means of the keypad, wherein activation of said second key means present a successive optional function for selection.

4. The trip device of claim 3, wherein when all the optional functions have been stored in the memory, and activation of said second key means enables all the functions selected to be displayed for monitoring purposes.

5. The trip device of claim 4, wherein activation of the first key means, after all the functions selected have been displayed for monitoring purposes, causes said selected functions to be stored in the electrically erasable programmable read only memory.

6. The trip device of claim 3, wherein during operation of said selection subroutine, only the first and second key means are accepted by the processing unit.

* * * * *